United States Patent
Wang et al.

(10) Patent No.: US 10,997,736 B2
(45) Date of Patent: May 4, 2021

(54) CIRCUIT FOR PERFORMING NORMALIZED CROSS CORRELATION

(71) Applicant: Apple Inc., Cupertino, CA (US)

(72) Inventors: Muge Wang, San Jose, CA (US); Junji Sugisawa, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 16/100,780

(22) Filed: Aug. 10, 2018

(65) Prior Publication Data

US 2020/0051256 A1  Feb. 13, 2020

(51) Int. Cl.
| | | |
|---|---|---|
| G06T 7/32 | (2017.01) | |
| G06T 7/00 | (2017.01) | |
| G06T 7/33 | (2017.01) | |
| G06T 5/00 | (2006.01) | |
| G06T 7/20 | (2017.01) | |
| G06K 9/62 | (2006.01) | |

(52) U.S. Cl.
CPC .............. *G06T 7/32* (2017.01); *G06K 9/6202* (2013.01); *G06T 5/002* (2013.01); *G06T 7/0002* (2013.01); *G06T 7/20* (2013.01); *G06T 7/337* (2017.01)

(58) Field of Classification Search
None
See application file for complete search history.

(56) References Cited

U.S. PATENT DOCUMENTS

| | | | |
|---|---|---|---|
| 7,728,909 B2 | 6/2010 | Poon | |
| 9,087,384 B2 | 7/2015 | Holeva et al. | |
| 9,858,636 B1 | 1/2018 | Lim et al. | |
| 10,176,551 B2* | 1/2019 | Park | ............................ G06T 5/20 |
| 10,325,342 B2* | 6/2019 | Park | ....................... G06T 15/005 |
| 10,489,478 B2* | 11/2019 | Lim | ........................ G06F 17/153 |
| 10,489,880 B2* | 11/2019 | Park | ........................ G06T 5/001 |

(Continued)

FOREIGN PATENT DOCUMENTS

WO  WO 2016183380  11/2016

OTHER PUBLICATIONS

Siena, S., "Improving the Design and Use of Correlation Filters in Visual Tracking," Carnegie Mellon University Pittsburgh, PA, Sep. 2017, 141 Pages.

(Continued)

*Primary Examiner* — Kim Y Vu
*Assistant Examiner* — Nathan J Bloom
(74) *Attorney, Agent, or Firm* — Fenwick & West LLP (57) ABSTRACT

Embodiments relate to a normalized cross correlation (NCC) circuit that can perform a normalized cross correlation between input patch data and kernel data. An interface circuit of an image signal processor receives input patch data from a source. Input patch data is data that represents a portion of a frame of image data from the source. The NCC circuit includes a filtering circuit and a normalization circuit. The filtering circuit receives the input patch data from the interface circuit and performs a convolution on the received input patch data or processed patch data derived from the input patch data with kernel data to produce convolution output data. The normalization circuit computes a normalized score output based on the convolution output data and the kernel data. The normalized score output includes normalization scores for each location of the convolution output data.

20 Claims, 5 Drawing Sheets

(56) References Cited

U.S. PATENT DOCUMENTS

| | | | |
|---|---|---|---|
| 10,606,948 B2* | 3/2020 | Hicks | G01C 23/005 |
| 10,685,421 B1* | 6/2020 | Park | G06T 1/20 |
| 2006/0034505 A1* | 2/2006 | Luk-Pat | G06T 5/20 |
| | | | 382/144 |
| 2008/0031542 A1* | 2/2008 | Lei | G07D 7/206 |
| | | | 382/283 |
| 2014/0192066 A1* | 7/2014 | Savransky | G06T 1/20 |
| | | | 345/506 |
| 2015/0146915 A1* | 5/2015 | Peng | G06K 9/00986 |
| | | | 382/103 |

OTHER PUBLICATIONS

Do, N.H., "Parallel processing for adaptive optics optical coherence tomography (AO-OCT) image registration using GPU," Purdue University Indianapolis, Indiana, Aug. 2016, 79 Pages.

\* cited by examiner

FIG. 5 ated Arts
CIRCUIT FOR PERFORMING NORMALIZED CROSS CORRELATION

BACKGROUND

1. Field of the Disclosure

The present disclosure relates a circuit for processing images and more specifically for performing normalized cross correlation between image data and kernel data.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

SUMMARY

Embodiments relate to a normalized cross correlation (NCC) circuit that can perform a normalized cross correlation between input patch data and kernel data. An interface circuit of an image signal processor receives input patch data from a source (e.g., image sensor, system memory, etc.). Input patch data is data that represents a portion of a frame of image data from the source. The NCC circuit includes a filtering circuit and a normalization circuit. The filtering circuit receives the input patch data from the interface circuit and performs a convolution on the received input patch data or processed patch data derived from the input patch data with kernel data to produce convolution output data. The normalization circuit computes a normalized score output based on the convolution output data and the kernel data. The normalized score output includes normalization scores for each location of the convolution output data.

In one or more embodiments, the filtering circuits may further compute the moving summation of the input data or the processed input data values, and the moving summation of the square of the input data or processed input data values.

In one or more embodiments, the NCC circuit may include a gain offset clipping circuit, a kernel summation circuit, and a peak finding circuit. The gain offset clipping circuit receives input patch and scales the input patch data to generate the processed patch data. The processed patch data is a scaled version of the input patch data. The kernel summation circuit computes a sum of kernel values in each location of the kernel data and/or a sum of squares of kernel values in each location of the kernel data. The peak finding circuit selects a peak value of the normalized score output from the computed normalization scores. The peak finding circuit may output a location of a computed normalization score in the normalized score output corresponding to the peak value.

BRIEF DESCRIPTION OF THE DRAWINGS

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a normalized cross correlation (NCC) circuit that can perform a normalized cross correlation on input patch data and kernel data and produce a normalized cross correlation score. The normalized cross correlation score includes multiple normalization scores. The NCC circuit may generate a peak value of the normalized correlation score and location corresponding to the peak value.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
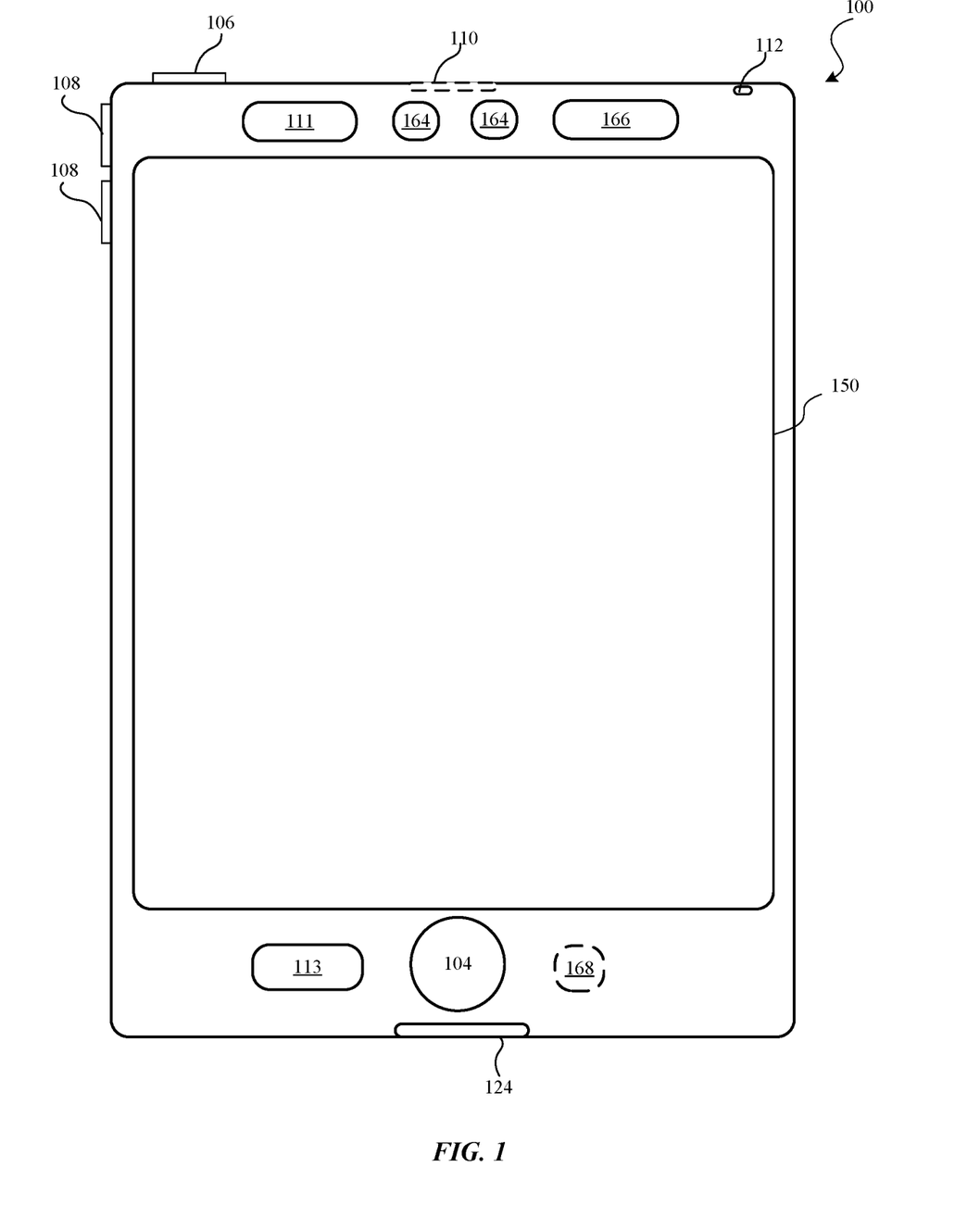
FIG. 1 is a high-level diagram of an electronic device, according to one embodiment

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
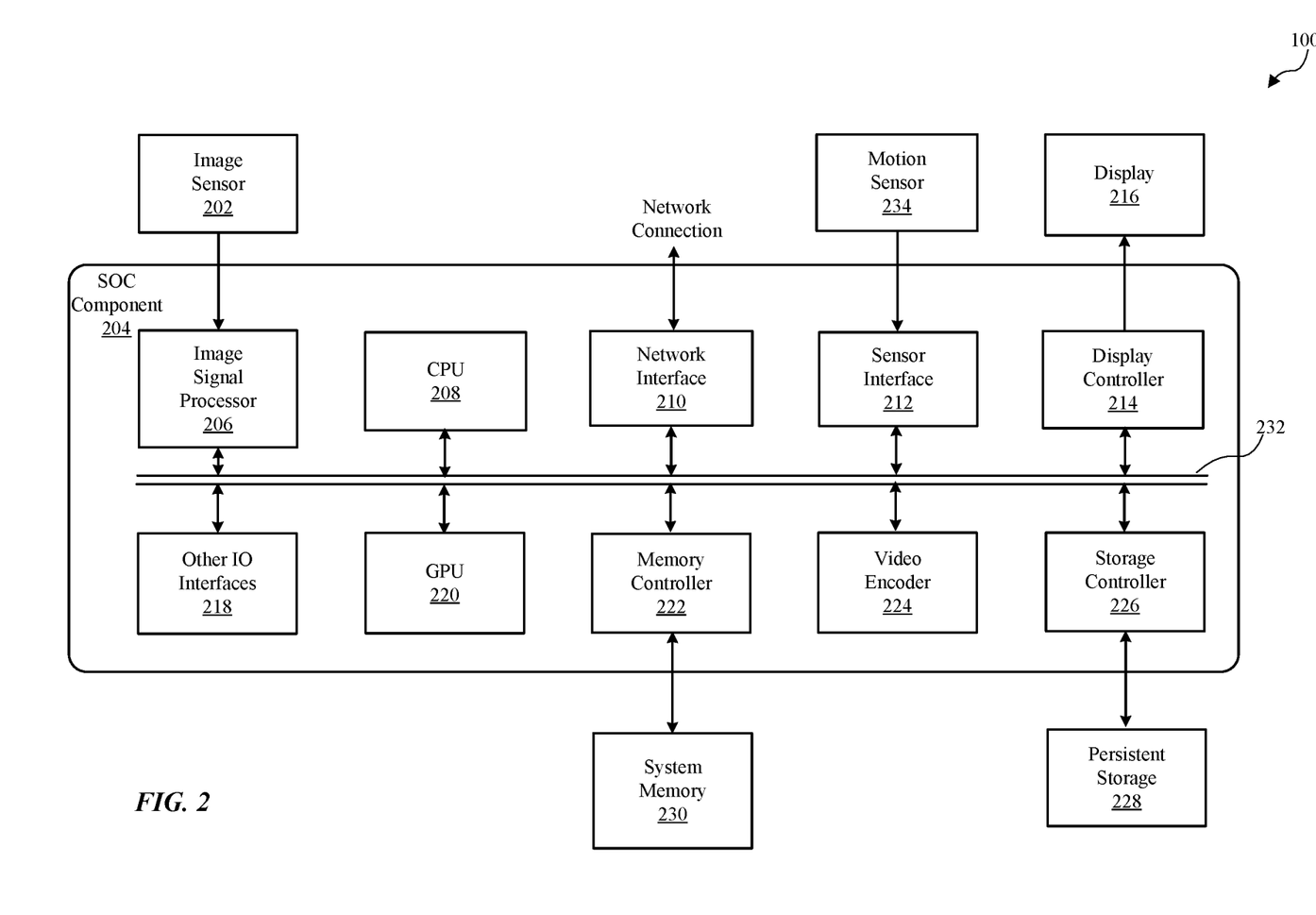
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
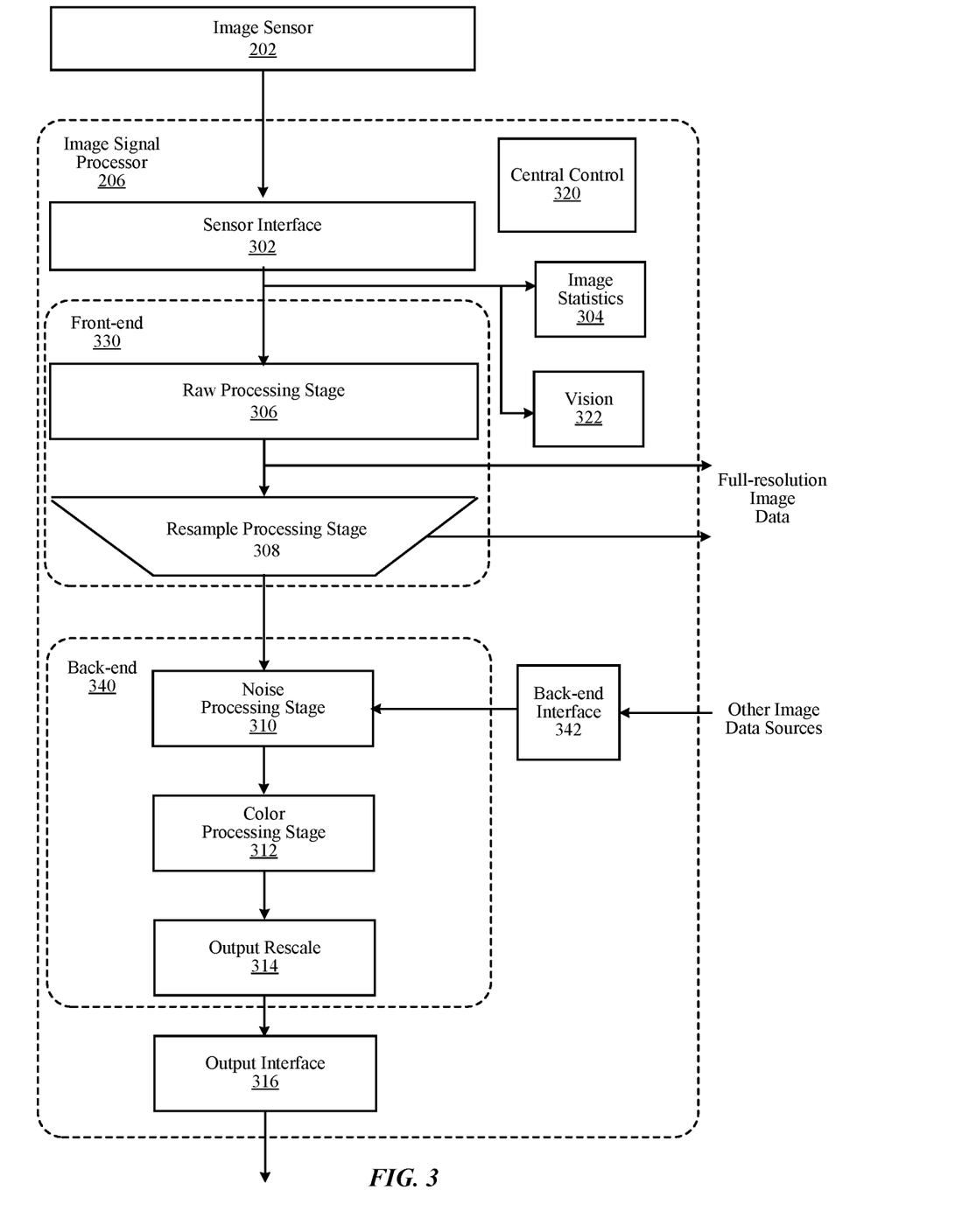
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control module 320, front-end pipeline stages 330, back-end pipeline stages 340, image statistics module 304, vision circuit 322, back-end interface 342, and output interface 316. ISP 206 may include other components not illustrated in FIG. 3 or may omit one or more components illustrated in FIG. 3.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 308 may process image data in a Bayer raw format.

The operations performed by raw processing stage 308 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 308 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision circuit 322 performs various operations to facilitate computer vision operations at CPU 208 such as facial detection in image data. The vision circuit 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross correlation between a patch of image and a kernel.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Normalized Cross Correlation Circuit

A normalized cross correlation circuit can be used to identify and locate features in images (e.g., feature matching). For example, the input to the normalized cross correlation circuit is an input image and a kernel (e.g., template corresponding to a feature of interest). For this purpose, the normalized cross correlation circuit can compute a normalized cross correlation between the input image and the kernel. The normalized cross correlation result can be used to identify a best match between the kernel and the input image. For example, a location of the peak value in the normalized cross correlation result indicates a location of a best match of the kernel to a portion of the input image that is the size of the kernel in the input image. A cross correlation is an operation similar to a convolution. For example, a correlation may be the same as a convolution except a kernel is rotated 180 degrees before performing a convolution.

Figure 4:
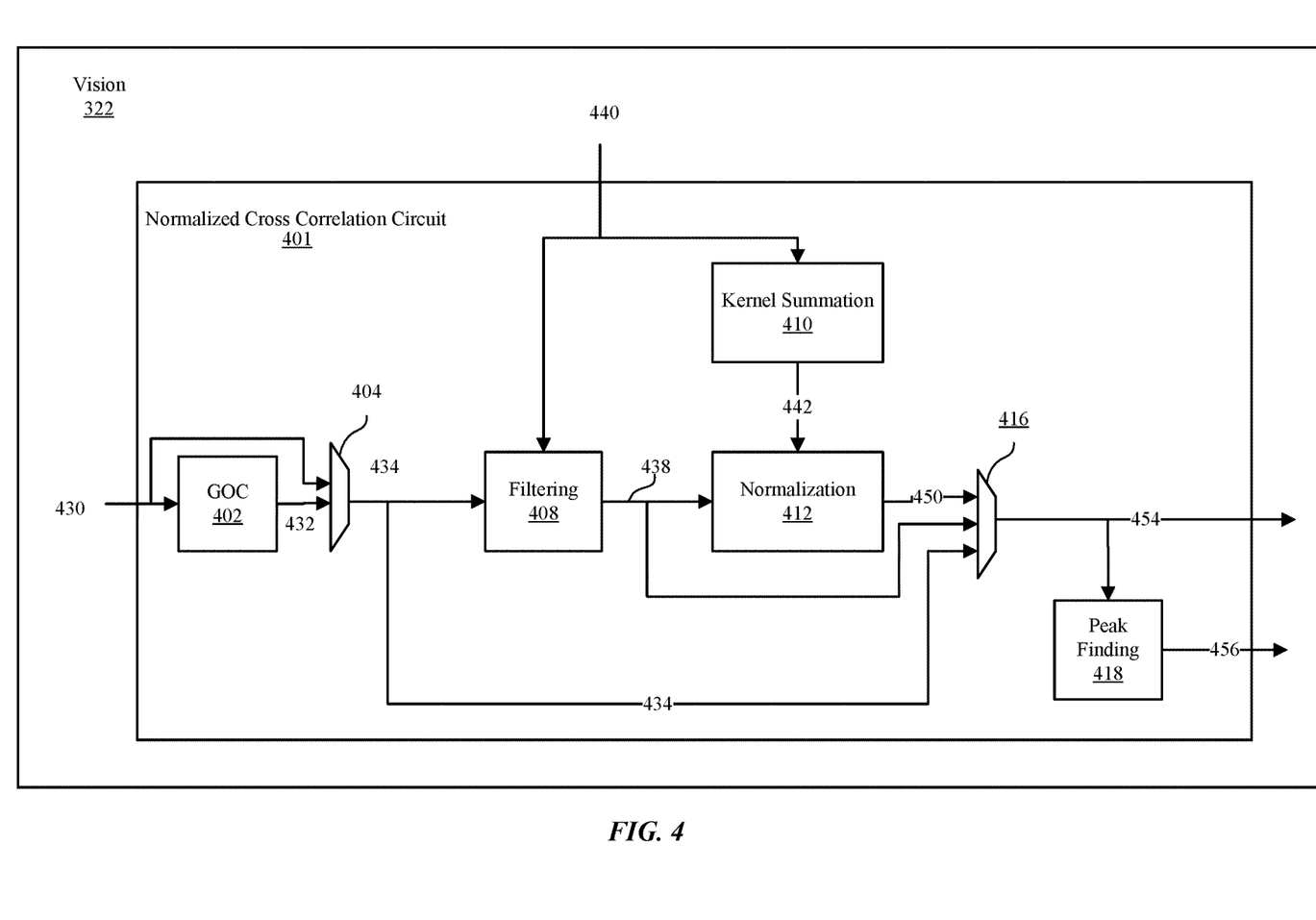
FIG. 4 is a block diagram of a normalized cross correlation circuit, according to one embodiment.

FIG. 4 is a block diagram of a normalized cross correlation circuit 401, according to one embodiment. In one embodiment, the normalized cross correlation (NCC) circuit 401 is included in the vision circuit 322 of FIG. 3. The NCC circuit 401 is configured to compute a normalized score output (e.g., normalized cross correlation) between input patch data 430 and kernel data 440. The input patch data 430 represents a portion of a frame of image data from a source (e.g., image sensor 202, system memory 230). The normalized score output 450 includes multiple normalization scores for each location of the convolution output based on the convolution output data and the kernel data. The NCC circuit 401 can generate and output peak data 456 including a peak value and location of the normalized score output.

The NCC circuit 401 may include a register circuit (not shown) for storing operating parameters. The register circuit may receive operating parameters from the central control 320 during a configuration cycle. One or more operating parameters may enable or disable various components in the NCC circuit 401. For example, an enable parameter may be used to enable operations of a circuit component if a value is set to "1" and disable or bypass components for performing such operations if the value is set to "0".

The gain offset clipping (GOC) circuit 402 receives input patch data 430 from the image sensor 202 via the sensor interface 302 or from the system memory 230 via the memory controller 222 and produces processed input patch data 432 by performing operations including addition of offsets, multiplication of scaling factors, and clipping of the input patch data 430. For example, the input patch data may be gained up (e.g., increased in gain, amplified) and followed by clipping to compensate for the exposure difference between the image data and kernel data to ensure that better precision can be achieved in the subsequent computation. The GOC circuit 402 outputs the processed (i.e., scaled) input patch data 432. The GOC circuit 402 may also receive an enable operating parameter from a register circuit of the NCC circuit 401. When the enable parameter is set to "1", the GOC circuit 402 is enabled, and when the enable parameter is set to "0", the GOC circuit 402 is bypassed or disabled and does not produce processed input patch data 432.

The multiplexer 404 selectively outputs input patch data 430 or processed input patch data 432 based on a value of a select parameter indicating whether or not the GOC circuit 402 is being bypassed. The multiplexer 404 receives the input patch data 430 from the sensor interface 302 or the memory controller 222 and scaled input patch data 432 from the GOC circuit 402. The multiplexer 404 may receive the select parameter as the enable parameter associated with the GOC circuit 402 (e.g., as a selection control signal) from a register circuit of the NCC circuit 401. When the enable parameter associated with the GOC circuit 402 is set to "1", indicating the GOC circuit 402 is enabled, the multiplexer 404 may select the processed input patch data 432. When the enable parameter is set to "0", indicating the GOC circuit 402 is bypassed, the multiplexer 404 may select the received input patch data 430. The output of the multiplexer 404 is selected input patch data 434 which corresponds to either the processed input patch data 432 or the received input patch data 430.

The filtering circuit 408 is configured to compute a generalized filtering operation between selected input patch data 434 and kernel data 440, and an optional moving summation of the selected input patch data 434 and a square of the selected input patch data 434, at the same locations that the filtering are computed, for calculating a normalized output. The filtering circuit 408 may receive kernel data 440 from a kernel direct memory access (DMA) circuit. In one embodiment, the kernel direct memory access circuit is a read circuit that fetches kernel data from a source (e.g., system memory 230) and sends kernel data 440 to the filtering circuit 408. The kernel data 440 can be template data generated by CPU 208, etc. The kernel data 440 can be portions of image frame data, similar to input data, which may represent image features or templates to be matched. In that case, a kernel DMA circuit may be used to fetch a portion of data of interest instead of entire frame images. In some embodiments, a kernel data interface circuit (e.g., memory controller 222) receives kernel data and fetches kernel data or portions of kernel data from memory (e.g., system memory 230). The kernel data interface circuit can process a plurality of input patches with a plurality of kernels to allow for matching multiple features. The filtering circuit 408 computes a convolution (e.g., convolution output data) between selected input patch data 430 and kernel data 440. For example, the filtering circuit 408 computes a convolution according to the expression $\Sigma_{(x,y)} I(x+u, y+v) K(x, y)$, where $(x, y)$ represents locations in the kernel K and $(u,v)$ represents the spatial shift between the input I and the kernel K. The filtering circuit 408 computes a moving summation of the selected input patch data 430 and a square of the selected input patch data 434. For example, the filtering circuit 408 computes a moving summation of the selected input patch data according to the expression $\Sigma_{(x,y)} I(x+u, y+v)$ and a moving summation of the square of the selected input patch data according to the expression $\Sigma_{(x,y)} (x+u, y+v)$, where $(x, y)$ represents locations in the kernel K and $(u,v)$ represents the spatial shift between the input I and the kernel K. As a result, the filtering circuit 408 outputs the filtered data 438. The filtered data 438 includes the convolution output data, the moving summation of the selected input patch data 430 and a square of the selected input patch data 434. The filtering circuit 408 may also receive an enable operating parameter associated with a normalization circuit 412 from a register circuit of the NCC circuit 401. When the enable parameter is set to "1", indicating a normalization mode is enabled, the filtering circuit 408 computes the convolution between selected input patch data 436 and kernel data 440, the moving sum of the selected input patch data 436 and the square of the selected input patch data 436. When the enable parameter is set to "0", indicating a normalization mode is disabled, the filtering circuit 408 computes only the convolution between the input patch data 436 and the kernel data 440, and does not compute the moving sum of the selected input patch data 436 and the square of the selected input patch data 436. The filtering circuit 408 may further use different modes for computing the convolution between input data I (e.g., input patch data 436) and kernel data K (e.g., kernel data 440): $sum_{x,y}(I(x+u,y+v)*k(x,y))$. Instead of the multiplication between each pixel value of I and K, addition, subtraction or absolute difference can be used. This allows other special type of operations to be computed. For example, if absolute difference of I and K is computed followed by the summation of absolute difference between each input data and kernel data, the filtering operation becomes a sum of absolute differences (SAD). In some embodiments, the filtering circuit 408 may optionally perform the convolution, summation of input data, and summation of square of input data by skipping some locations to speed up processing. This can be implemented by changing a value of a step value. For example, if a step value is 1, then no locations are skipped. If a step value is two, then every other location is skipped in the filtering operation. This can expedite the filtering operation while still being able to cover large spatial locations.

The kernel summation circuit 410 receives kernel data 440 (e.g., from kernel DMA circuit or kernel data interface circuit) and computes a sum of the kernel data 440 and a sum of squares of the kernel data 440. The kernel summation circuit 410 computes the summation of the kernel coefficients, and the summation of the squares of each kernel coefficient. For example, the kernel summation circuit 410 computes a summation of the kernel coefficients according to the following expression $\Sigma_{(x,y)} K(x, y)$, and computes a summation of the squares of each kernel coefficient according to the following expression $\Sigma_{(x,y)}K^2(x, y)$, where (x, y) represents locations in the kernel K. The kernel summation circuit 410 outputs kernel summation data 442. Kernel summation data 442 includes the sum of kernel data 440 and the sum of squares of kernel data 440. In some embodiments, a kernel data interface circuit may fetch multiple sets of kernel data. The kernel summation of each of the kernel coefficients and kernel summation of the squares of each of the coefficients are computed for each set of kernel data. Thus, the NCC circuit 401 can receive multiple sets of data at the input end, and multiple sets of data at the kernel end as well.

The normalization circuit 412 is configured to compute a normalized score output 450. For this purpose, the normalization circuit 412 receives kernel summation data 442 including the sum of kernel data 440 and the sum of squares of kernel data 440 from the kernel summation circuit 410. The normalization circuit 412 also receives filtered data 438 including the result of the convolution between selected input patch data 434 and kernel data 440, the moving sum of the selected input patch data 434 and the square of the selected input patch data 434 from the filtering circuit 408. The normalization circuit 412 processes, for each location in the convolution output (e.g., result of the convolution between selected input patch data 436 and kernel data 440), a normalization score based on the convolution output, sum of kernel data 440, the sum of squares of kernel data 440, moving sum of the selected input patch data 434 and the square of the selected input patch data 434. The normalization circuit 412 outputs the normalized score output 450 including the normalization scores that correspond to each spatial shift of the convolution. The normalization circuit 412 may also receive an enable operating parameter from a register circuit of the NCC circuit 401. When the enable parameter is set to "1", the normalization circuit 412 is enabled, and when the enable parameter is set to "0", the normalization circuit 412 is bypassed or disabled and does not produce normalized score output 450. In some embodiments, when the normalization circuit 412 is disabled, filtering circuit 408 may use different modes (e.g., SAD) for computing the convolution.

The normalization circuit 412 may compute the normalized cross correlation score, for example, by use of the following equation:

$$y(u,v) = \frac{\sum_{(x,y)} I(x+u, y+v)K(x,y) - \frac{1}{N}\sum_{(x,y)} I(x+u, y+v) * \frac{1}{N}\sum_{(x,y)} K(x,y)}{\sqrt{\sum_{(x,y)} I^2(x+u, y+v) - \frac{1}{N^2}(\sum_{(x,y)} I(x+u, y+v))^2} \sqrt{\sum_{(x,y)} K^2(x,y) - \frac{1}{N^2}(\sum_{(x,y)} K(x,y))^2}}$$

The first term of the numerator is the convolution, where (u,v) represent the spatial shift between the input I and the kernel K and (x,y) represent a location in the kernel K. The number N represents the total number of elements in the kernel K. The moving sum of the input is a summation over (x,y) of $I(x+u,y+v)$, and the moving sum of the input square is the summation over (x,y) of $I^2(x+u,y+v)$. The summation of kernel values (e.g., computed by the kernel summation circuit 410) is computed over (x,y) of $K(x,y)$, and summation of kernel square values is computed over (x,y) of $K^2(x,y)$. For each (u,v), the convolution (correlation) between I and K, summation of I, and the summation of $I^2$, are computed, in filtering circuit 408. Together with summation of K and summation of $K^2$, which are not changed with respect to (u,v), an NCC score at (u,v) can be computed by normalization circuit 412.

The multiplexer 416 selectively outputs normalized score output 450, filtered data 438, or selected input patch data 434 as its output 454 based on a value of a select parameter indicating which circuits are enabled. The multiplexer 416 receives the normalized data 450 from the normalization circuit 412, the filtered data 438 from the filtering circuit 408, and the selected input patch data 434 from the multiplexer 404. The multiplexer 416 may receive the select parameter as the enable parameters associated with the filtering circuit 408 and the normalization circuit 412 from a register circuit of the NCC circuit 401. For example, if the enable parameter of the normalization circuit is set to "1", indicating the normalization circuit 412 is enabled, the multiplexer 404 may select the normalized score output 450. If the enable parameter of the normalization circuit is set to "0", indicating the normalization circuit 412 is disabled and the enable parameter of the filtering circuit is set to "1", indicating the filtering circuit is enabled, the multiplexer 404 may select the filtered output 438 which includes only the convolution output. If the enable parameter for the filtering circuit is set to "0", indicating the filtering circuit 408 is bypassed, the multiplexer 416 may select the selected input patch data 434. The multiplexer 416 outputs selected output data 454 which is either the normalized score output 450, the filtered data 438, or the selected input patch data 434.

In some embodiments, the multiplexer 416 receives scaled and shifted select output. The NCC circuit 401 may include a scale offset shift circuit (not shown) that processes the filtered data 438 to produce a scaled, offset, and bit shifted version of the convolution output of the filtered data 438. The multiplexer 416 outputs selected output data 454 which is either the normalized score output 450, a scaled, offset, and bit shifted version of the convolution output of the filtered data 438, or the selected input patch data 434.

The peak finding circuit 418 determines a peak value and location of the selected output 454. The peak finding circuit 418 receives the selected output data 454 from the multiplexer 416. The peak finding circuit 418 computes the peak (i.e., maximum or minimum) value of the selected output data 454 and location corresponding to the peak value of the selected output data 454. The peak finding circuit outputs peak data 456 including the peak (i.e., maximum or minimum) value of the selected output data 454 and location corresponding to the peak value of selected output data 454. An optional interpolation may be performed based on the peak value and the values next to the peak locations to obtain an interpolated location that has better precision (e.g., subpixel interpolation).

Figure 5:
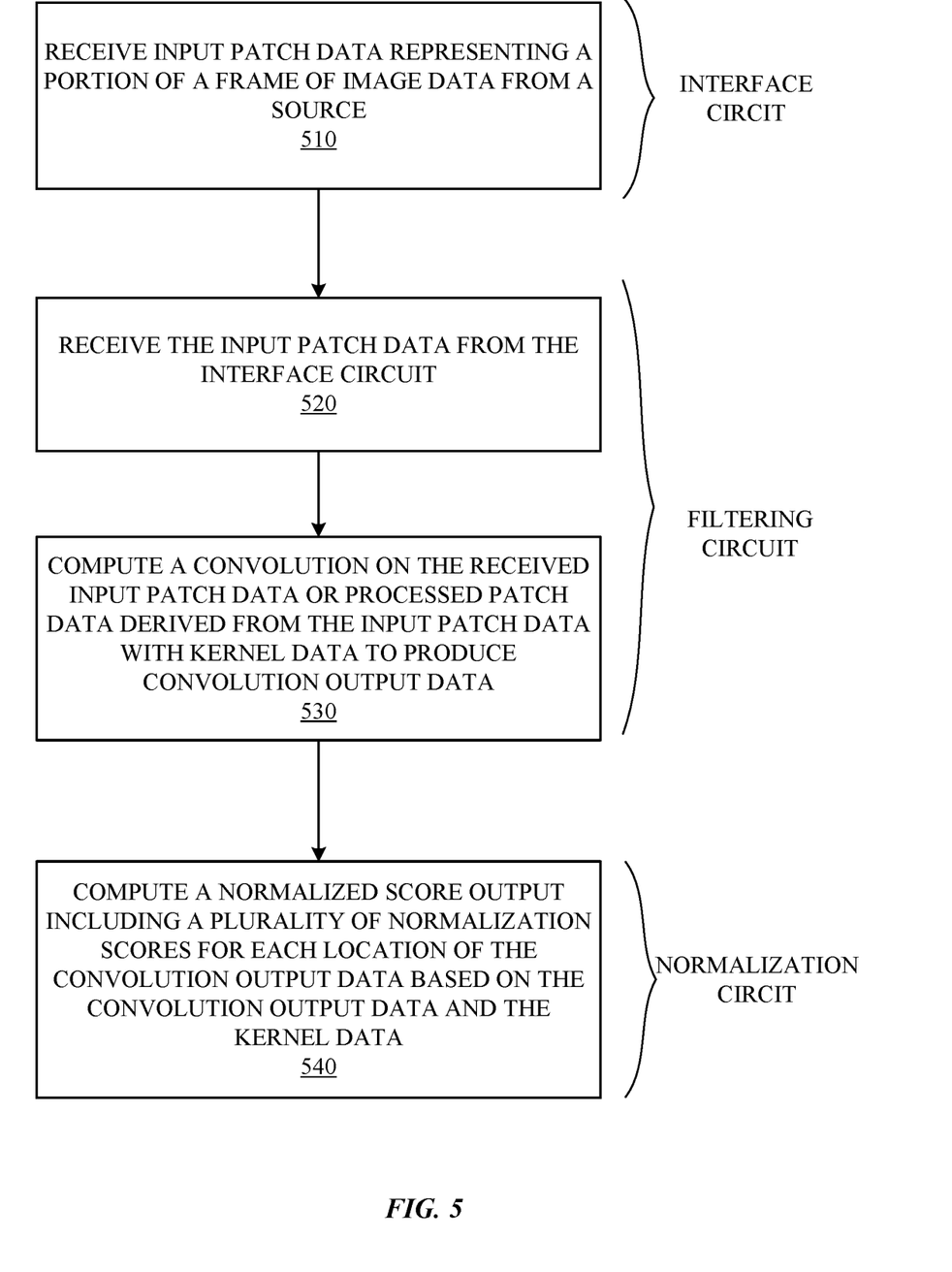
FIG. 5 is a flowchart illustrating a method of performing normalized cross correlation between input patch data and kernel data, according to one embodiment.

FIG. 5 is a flowchart illustrating a method of performing normalized cross correlation between input patch data and kernel data, according to one embodiment. An interface circuit receives 510 input patch data representing a portion of a frame of image data from a source. The interface circuit is an interface between a source (e.g., image sensor 202 or system memory) and a normalized cross correlation circuit (e.g., NCC circuit 401) that may be part of a vision module (e.g., vision circuit 322) of an electronic device (e.g., electronic device 100). The NCC circuit includes the filtering circuit (e.g., filtering circuit 408) and a normalization circuit (e.g., normalization circuit 412). The kernel data may be received from a kernel data interface circuit (e.g., memory controller 222) from a source (e.g. system memory 230). The kernel data interface circuit may fetch all the kernel data from the source, or may fetch only a portion of the kernel data, which can be image frames, from the source.

The filtering circuit receives 520 the input patch data from the interface circuit and computes 530 a convolution on the received input patch data or processed patch data derived from the input patch data with kernel data to produce convolution output data. The processed patch data may be scaled input patch data including addition of offsets, multiplication of scaling factors, and clipping of the received input patch data. In some embodiments, the filtering circuit also computes a moving summation of selected input patch data and a square of the selected input patch data for calculating a normalized output. The filtering circuit may provide the computed information to the normalization circuit for further computation.

The normalization circuit computes 540 a normalized score output. The normalized score output includes multiple normalization scores for each location of the convolution output data. The normalized score output is based on the convolution output data and the kernel data. In computing the normalized score output, the normalization circuit processes, for each location in the convolution output, a normalization score. For example, each normalization score can be computed from the convolution output data, a sum of kernel data, a sum of squares of kernel data, a moving sum of the input patch data and the square of the input patch data. The normalization circuit can receive the sum of kernel data and the sum of squares of kernel data from a kernel summation circuit (e.g., kernel summation circuit 410) also included in the NCC circuit that computes the sums. The normalization circuit can receive the convolution output data, the moving sum of the input patch data and the square of the input patch data from the filtering circuit. The normalization circuit may further process the normalization scores at each filtering location and determine the peak score and corresponding location.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An apparatus for processing image signal data, comprising:
an interface circuit configured to receive input patch data representing a portion of a frame of image data from a source; and
a normalized cross correlation (NCC) circuit comprising:
a filtering circuit implemented in hardware and coupled to the interface circuit, the filtering circuit configured to receive the input patch data from the interface circuit and configured to perform a convolution on the received input patch data or processed patch data derived from the input patch data with kernel data to produce convolution output data; and
a normalization circuit implemented in hardware and configured to compute a normalized score output including a plurality of normalization scores for each location of the convolution output data based on the convolution output data and the kernel data, the normalization circuit comprising a register circuit configured to store operation parameters received in a configuration cycle.

2. The apparatus of claim 1, wherein the filtering circuit is further configured to:
compute a moving summation of the input patch data or the processed patch data, and a square of the input patch data or the processed patch data; and
output the moving summation of the input patch data or the processed patch data and the square of the input patch data or the processed patch data to the normalization circuit.

3. The apparatus of claim 1, wherein the NCC circuit further comprises a gain offset clipping circuit configured to receive input patch data and scale the input patch data to generate the processed patch data which is a scaled version of the input patch data.

4. The apparatus of claim 1, wherein the NCC circuit further comprises a kernel summation circuit configured to:
compute a kernel value summation and a kernel value square summation from the kernel data, wherein the kernel value summation is a sum of kernel values in each location of the kernel data and the kernel value square summation is a sum of squaring the kernel values in each location of the kernel data; and
output the kernel value summation and the kernel value square summation to the normalization circuit.

5. The apparatus of claim 1, wherein the NCC circuit further comprises a peak finding circuit configured to select a peak value of the normalized score output from the plurality of computed normalization scores.

6. The apparatus of claim 5, wherein the peak finding circuit is further configured to output a location of a computed normalization score in the normalized score output corresponding to the peak value.

7. The apparatus of claim 1, wherein the NCC circuit further comprises a multiplexer configured to selectively output one of (i) the normalized score output from the normalization circuit, (ii) a scaled, offset, and bit shifted version of the convolution output data, and (iii) the received input patch data or the processed patch data derived from the input patch data according to a selection control signal as the convolution output data.

8. A method of computing a normalization score on image data from image sensors, comprising:
receiving, by an interface circuit, input patch data representing a portion of a frame of the image data from a source;
receiving, by a filtering circuit implemented in hardware of a normalized cross correlation (NCC) circuit, the input patch data from the interface circuit;
computing, by the filtering circuit of the NCC circuit, a convolution on the received input patch data or processed patch data derived from the input patch data with kernel data to produce convolution output data;
receiving, by a normalization circuit of the NCC circuit, operation parameters in a configuration cycle;
storing, in a register circuit of the normalization circuit, the received operation parameters; and
computing, by a normalization circuit of the NCC circuit, a normalized score output including a plurality of normalization scores for each location of the convolution output data according to the stored operation parameters based on the convolution output data and the kernel data.

9. The method of claim 8, comprising:
computing, by the filtering circuit, a moving summation of the input patch data or the processed patch data, and a square of the input patch data or the processed patch data; and
outputting, by the filtering circuit, the moving summation of the input patch data or the processed patch data and the square of the input patch data or the processed patch data to the normalization circuit.

10. The method of claim 8, comprising:
receiving, by a gain offset clipping circuit of the NCC circuit, input patch data; and
scaling, by the gain offset clipping circuit, the input patch data to generate the processed patch data which is a scaled version of the input patch data.

11. The method of claim 8, comprising:
computing, by a kernel summation circuit of the NCC circuit, a kernel value summation and a kernel value square summation from the kernel data, wherein the kernel value summation is a sum of kernel values in each location of the kernel data and the kernel value square summation is a sum of squaring the kernel values in each location of the kernel data; and
outputting, by the kernel summation circuit, the kernel value summation and the kernel value square summation to the normalization circuit.

12. The method of claim 8, comprising:
selecting, by a peak finding circuit of the NCC circuit, a peak value of the normalized score output from the plurality of computed normalization scores.

13. The method of claim 12, comprising:
outputting, by the peak finding circuit, a location of a computed normalization score in the normalized score output corresponding to the peak value.

14. The method of claim 8, comprising:
selectively outputting, by a multiplexer of the NCC circuit, one of (i) the normalized score output from the normalization circuit, (ii) a scaled, offset, and shifted version of the convolution output data, and (iii) the received input patch data or the processed patch data derived from the input patch data according to a selection control signal as the convolution output data.

15. An electronic device, comprising:
an image sensor configured to generate image data;
an interface circuit configured to receive input patch data representing a portion of a frame of the image data from a source; and
a normalized cross correlation (NCC) circuit comprising:
a filtering circuit implemented in hardware and coupled to the interface circuit, the filtering circuit configured to receive the input patch data from the interface circuit and configured to perform a convolution on the received input patch data or processed patch data derived from the input patch data with kernel data to produce convolution output data; and
a normalization circuit implemented in hardware and configured to compute a normalized score output including a plurality of normalization scores for each location of the convolution output data based on the convolution output data and the kernel data, the normalization circuit comprising a register circuit configured to store operation parameters received in a configuration cycle.

16. The electronic device of claim 15, wherein the filtering circuit is further configured to:
compute a moving summation of the input patch data or the processed patch data, and a square of the input patch data or the processed patch data; and
output the moving summation of the input patch data or the processed patch data and the square of the input patch data or the processed patch data to the normalization circuit.

17. The electronic device of claim 15, wherein the NCC circuit further comprises a gain offset clipping circuit configured to receive input patch data and scale the input patch data to generate the processed patch data which is a scaled version of the input patch data.

18. The electronic device of claim 15, wherein the NCC circuit further comprises a kernel summation circuit configured to:
compute a kernel value summation and a kernel value square summation from the kernel data, wherein the kernel value summation is a sum of kernel values in each location of the kernel data and the kernel value square summation is a sum of squaring the kernel values in each location of the kernel data; and
output the kernel value summation and the kernel value square summation to the normalization circuit.

19. The electronic device of claim 15, wherein the NCC circuit further comprises a multiplexer configured to selectively output one of (i) the normalized score output from the normalization circuit, (ii) a scaled, offset, and shifted version of the convolution output data, and (iii) the received input patch data or the processed patch data derived from the input patch data according to a selection control signal as the convolution output data.

20. The apparatus of claim 1, wherein the operation parameters comprise an enable parameter for enabling or disabling the normalization circuit.

* * * * *